(12) United States Patent  
Tsugimura

(10) Patent No.: US 9,386,187 B2  
(45) Date of Patent: Jul. 5, 2016

(54) IMAGE PROCESSING APPARATUS AND OPERATIONS OF SELECTING COMPRESSION SCHEME TO GENERATE COMPRESSED FILE

(71) Applicant: BROTHER KOGYO KABUSHIKI KAISHA, Nagoya-shi, Aichi-ken (JP)

(72) Inventor: Koichi Tsugimura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/489,979

(22) Filed: Sep. 18, 2014

(65) Prior Publication Data

US 2015/0092210 A1    Apr. 2, 2015

(30) Foreign Application Priority Data

Sep. 30, 2013   (JP) .................................. 2013-205394

(51) Int. Cl.  
*H04N 1/46*    (2006.01)  
*H04N 1/41*    (2006.01)

(52) U.S. Cl.  
CPC ...................................... *H04N 1/41* (2013.01)

(58) Field of Classification Search  
None  
See application file for complete search history.

(56) References Cited

U.S. PATENT DOCUMENTS

| 7,925,098 B2 * | 4/2011 | Tamura ................ H04N 19/176 345/555 |
| 8,928,950 B2 * | 1/2015 | Kuraya .............. H04N 1/33315 358/447 |
| 2011/0255777 A1 | 10/2011 | Matsuoka |
| 2013/0148177 A1 * | 6/2013 | Kuraya .............. H04N 1/00013 358/505 |

FOREIGN PATENT DOCUMENTS

| JP | 5-225378 A | 9/1993 |
| JP | 2000-307854 A | 11/2000 |
| JP | 2002-288589 A | 10/2002 |
| JP | 2011-228811 A | 11/2011 |
| JP | 2012-074852 A | 4/2012 |

* cited by examiner

*Primary Examiner* — Steven Kau  
(74) *Attorney, Agent, or Firm* — Merchant & Gould P.C.

(57) ABSTRACT

An image processing apparatus includes: a processor configured to receive selection of one of options including a first-kind option and a second-kind option, and receive designation of a saving format and a compression level; acquire scan data generated; and generate a compressed file by compressing the scan data, wherein in a case where the first-kind option is selected and where a specific saving format is designated as the saving format, the processor configured to generate the compressed file by using a first compression scheme, regardless of the designated compression level. In a case where the second-kind option is selected and where the specific saving format is designated as the saving format, the processor configured to select one compression scheme from the first compression scheme and the second compression scheme, according to the designated compression level, and generate the compressed file by using the selected compression scheme.

9 Claims, 11 Drawing Sheets

FIG. 2

COMPRESSION PARAMETER TABLE (DESIGNATED RESOLUTION IS 300dpi) 242

TABLE PT1 (NORMAL COMPRESSION SCHEME)

| COMPRESSION LEVEL | 1 | 2 | 3 | 4 | 5 | 6 | 7 |
|---|---|---|---|---|---|---|---|
| COMPRESSION SCHEME | NORMAL | NORMAL | NORMAL | NORMAL | NORMAL | NORMAL | NORMAL |
| QUANTIZATION TABLE | A1 | A2 | A3 | A4 | A5 | A6 | A7 |
| RESOLUTION | 300 | 300 | 300 | 300 | 300 | 300 | 300 |

TABLE PT2 (HIGH COMPRESSION SCHEME)

| COMPRESSION LEVEL | 1 | 2 | 3 | 4 | 5 | 6 | 7 |
|---|---|---|---|---|---|---|---|
| COMPRESSION SCHEME | HIGH COMPRESSION | HIGH COMPRESSION | HIGH COMPRESSION | HIGH COMPRESSION | HIGH COMPRESSION | HIGH COMPRESSION | HIGH COMPRESSION |
| QUANTIZATION TABLE | B1 | B2 | B2 | B3 | B3 | B4 | B4 |
| BACKGROUND RESOLUTION | 300 | 300 | 250 | 250 | 200 | 200 | 150 |
| CHARACTER RESOLUTION | 300 | 300 | 300 | 300 | 300 | 300 | 300 |

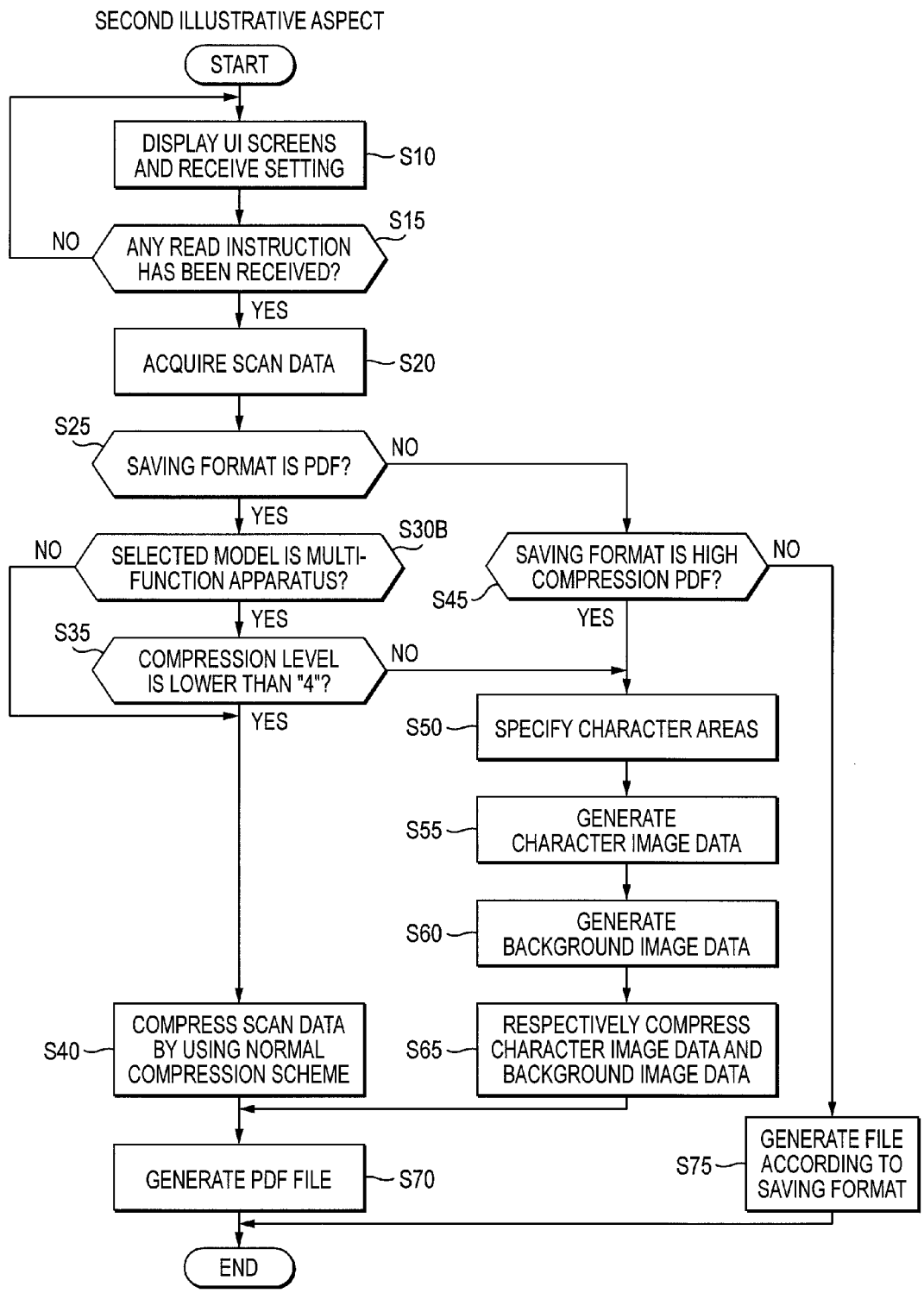

IMAGE PROCESSING APPARATUS AND OPERATIONS OF SELECTING COMPRESSION SCHEME TO GENERATE COMPRESSED FILE

CROSS-REFERENCE TO RELATED APPLICATION

This application claims priority from Japanese Patent Application No. 2013-205394 filed on Sep. 30, 2013, the entire subject matter of which is incorporated herein by reference.

TECHNICAL FIELD

This disclosure relates to a technology for compressing scan data obtained by optical reading of documents.

BACKGROUND

There is a technology for compressing scan data obtained by reading documents. In this technology, in a case where a read mode is an auto mode, a predetermined analyzing process is performed, whereby the kinds of documents are determined. Further, compressing schemes depending on the kinds of documents determined are used to compress scan data.

SUMMARY

This disclosure provides at least a technology capable of compressing scan data, thereby generating an appropriate compressed file.

This disclosure is to solve at least a part of the above described problem, and it can be implemented as the following illustrative aspects.

An image processing apparatus in one aspect of this disclosure includes a processor configured to: receive selection of one option from a plurality of options including a first-kind option and a second-kind option, with respect to a specific setting, and receive designation of a saving format for a compressed file and designation of a compression level of the compressed file; acquire scan data generated by optical reading of a document; and generate a compressed file by compressing the scan data. In a case where the first-kind option is selected and where a specific saving format is designated as the saving format for the compressed file, the processor is configured to generate the compressed file by using a first compression scheme, regardless of the designated compression level, and in a case where the second-kind option is selected and where the specific saving format is designated as the saving format for the compressed file, the processor is configured to select one compression scheme from the first compression scheme and the second compression scheme, according to the designated compression level, and generate the compressed file by using the selected one compression scheme.

According to the above described configuration, although the user designates the specific saving format, the user can select the options with respect to the specific setting, thereby using different compression schemes to generate the compressed file. As a result, a compressed file appropriate for the user can be generated.

A technology of this disclosure can be implemented in various forms such as a method including operations implementing the functions of the above described apparatus, a computer program for implementing the functions of the above described apparatus or a recording medium having the corresponding computer program stored therein.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2 is a view illustrating an illustrative aspect of a compression parameter table group;

FIG. 9 is a flow chart illustrating image processing of a second illustrative aspect;

DETAILED DESCRIPTION

A. First Illustrative Aspect

A-1. Configuration of Image Processing Apparatus

Figure 1:
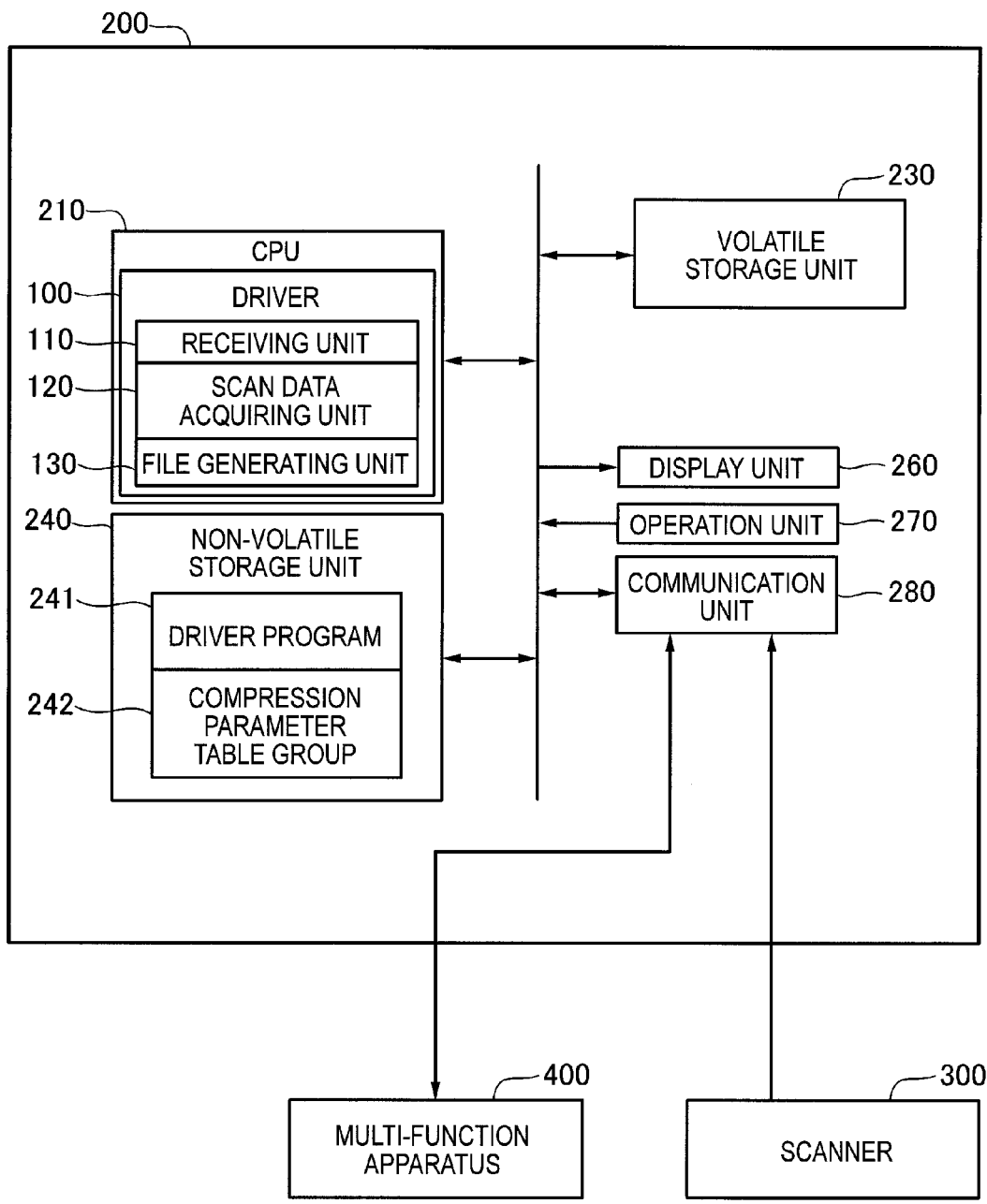
FIG. 1 is a block diagram illustrating the configuration of a computer 200 as an image processing apparatus.

Now, an embodiment of this disclosure will be described on the basis of illustrative aspects. FIG. 1 is a block diagram illustrating the configuration of a computer 200 as an image processing apparatus of a first illustrative aspect.

The computer 200 is, for example, a personal computer, and includes a CPU 210, a volatile storage unit 230 such as a RAM, a non-volatile storage unit 240 such as a hard disk drive or a ROM, a display unit 260 such as a liquid crystal display, an operation unit 270 such as a mouse and a keyboard, and a communication unit 280 for communication with an external apparatus.

The computer 200 is connected to a scanner 300 and a multi-function apparatus 400 through the communication unit 280 such that communication is possible. The multi-function apparatus 400 has a scanning function of optical reading of documents, thereby generating scan data, and a printing function of printing images onto paper sheets in a predetermined scheme (for example, a laser scheme or an inkjet scheme). The scanner 300 is a dedicated scanner which has a scanning function but does not have a printing function.

The volatile storage unit 230 provides a buffer area for temporarily storing a variety of intermediate data which is generated when the CPU 210 performs processing. The non-volatile storage unit 240 stores a driver program 241 and a compression parameter table group 242. The driver program 241 may be downloaded from a server on the Internet or may be downloaded from a DVD-ROM or the like.

The CPU 210 executes the driver program 241, thereby acting as a driver 100 which controls the scanner 300 or the multi-function apparatus 400. The driver 100 performs, for example, image processing (FIG. 3) for compressing scan data, thereby generating a compressed file. Specifically, the driver 100 includes a receiving unit 110 which displays user interface (UI) screens on the display unit 260 and receives instructions associated with various kinds of setting from a user, a scan data acquiring unit 120 which controls the scanner 300 or the multi-function apparatus 400, thereby acquiring scan data, and a file generating unit 130 which compresses the scan data, thereby generating a compressed file.

A-2. Compression Level and Compression Scheme

FIG. 2 is a view illustrating an illustrative aspect of the compression parameter table group 242. The compression parameter table group 242 includes a plurality of compression parameter tables usable for the file generating unit 130 to compress scan data. One compression parameter table is selected from the plurality of compression parameter tables and is referred to for compressing scan data, as described below. FIG. 2 illustrates two compression parameter tables PT1 and PT2 of the plurality of compression parameter tables.

In each compression parameter table, each of compression levels 1 to 7 representing compression ratios has been stored in association with a corresponding set of compression parameters defining a compression scheme. As the compression level rises, the compression ratio increases, and the data size of a compressed file decreases.

The compression parameter table PT1 (FIG. 2) is a table which is referred to in a case of using a normal compression scheme (also referred to as first compression scheme). The compression parameter table PT2 is a table which is referred to in a case of using a high compression scheme (also referred to as second compression scheme).

In the high compression scheme, the file generating unit 130 divides scan data into character image data and background image data. Thereafter, the file generating unit 130 compresses the character image data by a lossless compression process (in the present embodiment, a compression scheme using a modified read (MMR) scheme (also referred to as FAXG4 scheme)). Also, the file generating unit 130 compresses the background image data by a lossy compression process (in the present embodiment, a JPEG compression process).

In the normal compression scheme, the file generating unit 130 compresses scan data by a lossy compression process (in the present embodiment, a JPEG compression process). That is, in the normal compression scheme, a process of dividing scan data into character image data and background image data is not performed.

Each set of compression parameters includes information designating the kind of a quantization table to be used for JPEG compression. As shown in FIG. 2, in the normal compression scheme, any one of seven kinds of quantization tables A1 to A7 is used. In the high compression scheme, any one of four kinds of quantization tables B1 to B4 is used.

For example, each quantization table includes a total of 64 quantization coefficients arranged in an 8-by-8 matrix and corresponding to DCT coefficients which generated in an 8-by-8 matrix in a JPEG compression process and indicates frequency components. As the quantization coefficients become larger, the compression ratio of the JPEG compression process increases. In the seven kinds of quantization tables A1 to A7 for the normal compression scheme, as a trailing number of a reference symbol is larger, the 64 quantization coefficients is set to larger values, and thus the compression ratio becomes larger. Similarly, in the four kinds of quantization tables B1 to B4 for the high compression scheme, as a trailing number of a reference symbol is a larger, the 64 quantization coefficients is set to larger values, and thus the compression ratio becomes larger.

Each set of compression parameters for the high compression scheme (the compression parameter table PT2 of FIG. 2) further includes information designating a background resolution and information designating a character resolution. In the case of the normal compression scheme, since division of scan data is not performed, the background resolution and the character resolution are the same. In the case of the high compression scheme, the background resolution is the resolution of the background image data, and the character resolution is the resolution of the character image data. Therefore, in the high compression scheme, the background resolution and the character resolution may be different from each other. Also, as the resolution decreases, the compression ratio increases.

The compression parameter tables PT1 and PT2 of FIG. 2 represent illustrative aspects of tables which can be referred to in a case where a resolution designated by the user is 300 dpi (dots per inch). In the normal compression scheme, the resolution of an image compressed by JPEG compression is set to the resolution designated by the user. In the high compression scheme, the character resolution is set to the resolution designated by the user, and the background resolution is set to a resolution equal to or lower than the resolution designated by the user.

In the normal compression scheme, as the compression level increases, the compression ratio of a quantization table to be used is set to be higher. Therefore, as the compression level increases, the compression ratio of a compression process is set to be higher.

In the high compression scheme, as the compression level increases, the background resolution is set to be lower, and/or the compression ratio of a quantization table to be used is set to be higher. Therefore, as the compression level increases, the compression ratio of a compression process is set to be higher.

A-3. UI Screens

Subsequently, UI screens which are displayed on the display unit 260 in order for the receiving unit 110 to receive user's instructions during image processing (to be described below) will be described. FIGS. 3 to 6 are views illustrating illustrative aspects of UI screens.

Figure 3:
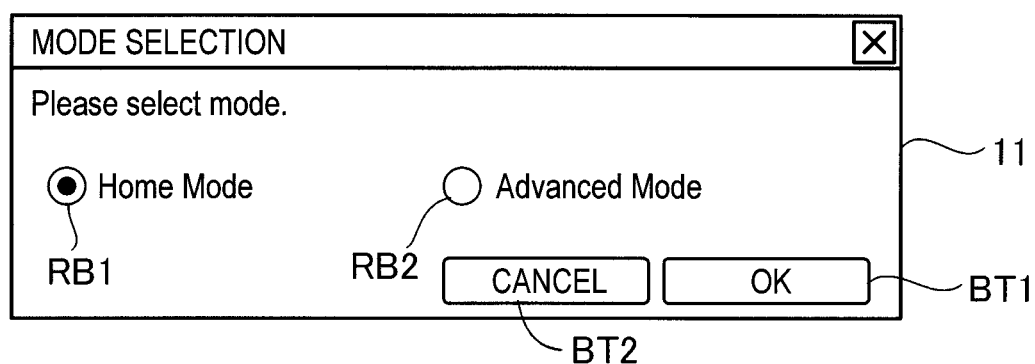
FIG. 3 is a view illustrating an illustrative aspect of a mode selection screen.
Figure 4:
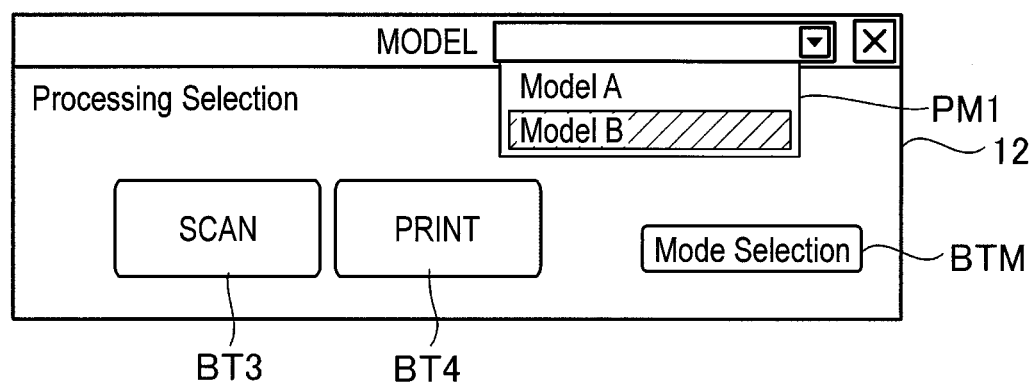
FIG. 4 is a view illustrating an illustrative aspect of a main screen.
Figure 5:
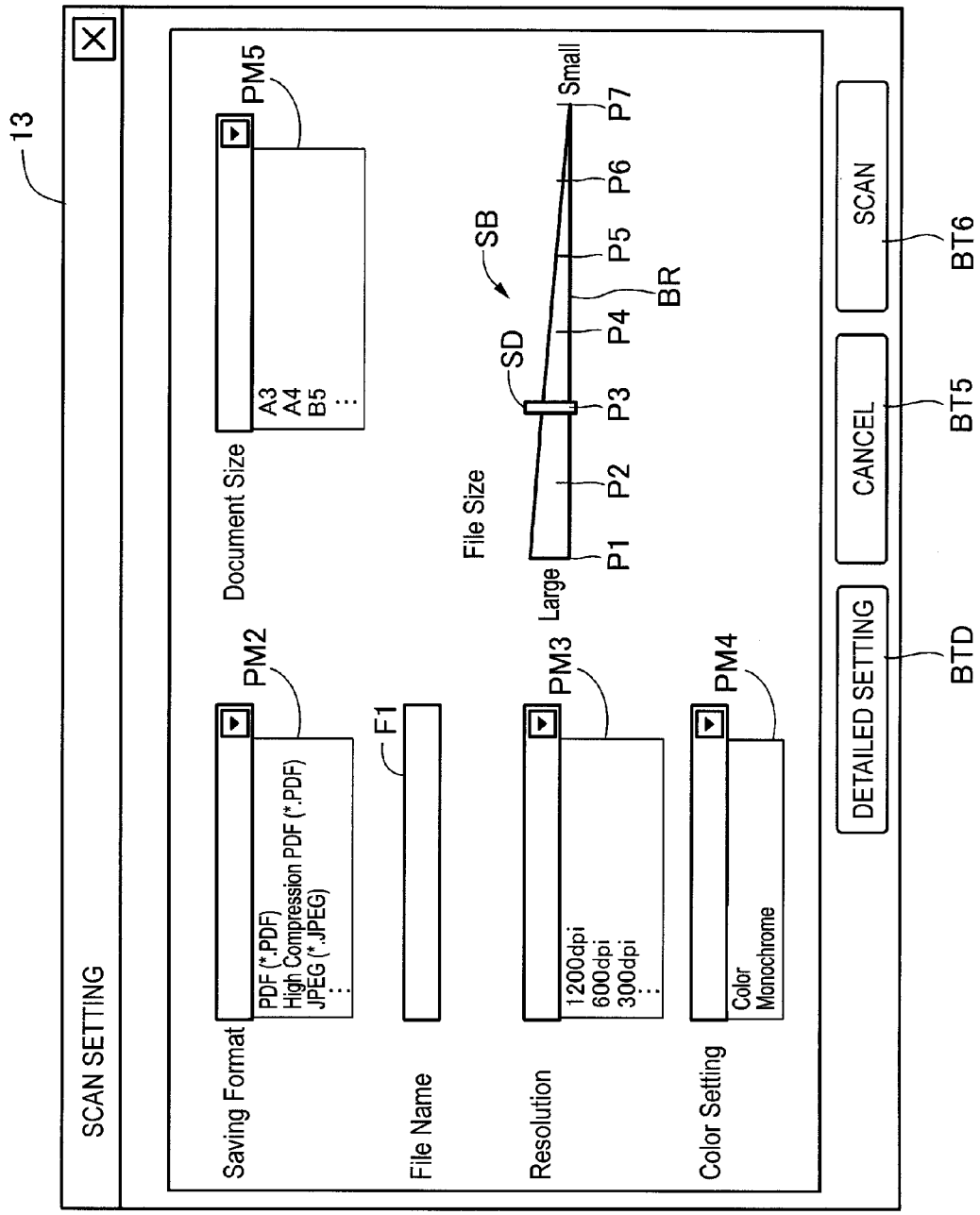
FIG. 5 is a view illustrating an illustrative aspect of a scan setting screen 13.
Figure 6:
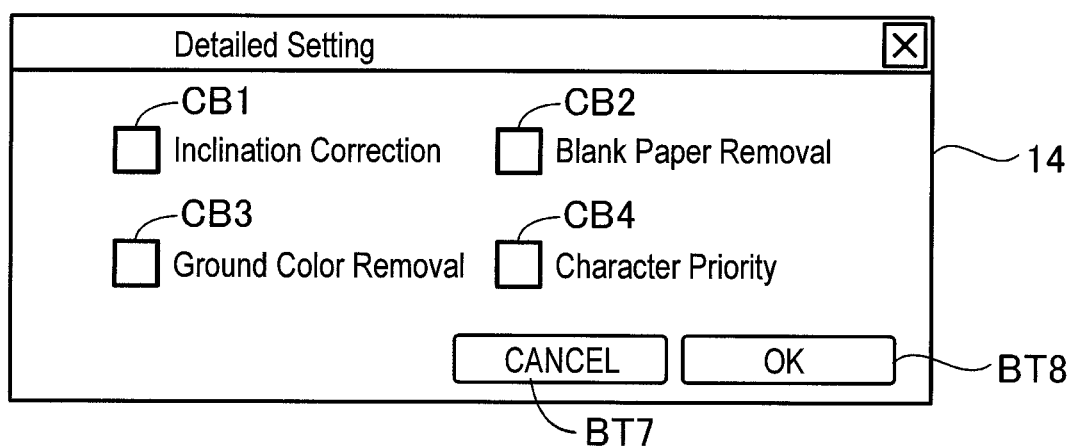
FIG. 6 is a view illustrating an illustrative aspect of a detail setting screen 14.

A mode selection screen 11 of FIG. 3 is a screen for setting a user interface mode. A main screen 12 of FIG. 4 is a screen for setting an apparatus to be used, and an image processing function (a scanning function or a printing function). A scan setting screen 13 of FIG. 5 is a screen for performing various kinds of setting associated with scanning. A scan detail setting screen 14 of FIG. 6 is a screen for performing detailed setting associated with scanning.

For example, if the user boots the driver 100 for the first time, the mode selection screen 11 of FIG. 3 is first displayed. Also, the mode selection screen 11 is displayed if a mode selection button BTM (FIG. 4) is pushed in the main screen 12. The driver 100 of the present illustrative aspect can operate in two user interface modes, that is, a "home mode" and an "advanced mode". The mode selection screen 11 includes radio buttons RB1 and RB2 representing two options representing the two modes, a button BT1 for confirming a selection, and a button BT2 for canceling a selection, with respect to setting of a user interface mode. The user can operate the radio buttons, thereby selecting any one option from the option representing the home mode and the option representing the advanced mode.

The advanced mode is a mode for users having a relatively high level of knowledge about image processing such as the scanning function or the printing function, in other words, a mode intended for intermediates or advanced users. The home mode is a mode for users having a relatively low level of knowledge about image processing, in other words, a mode intended for beginners. For example, since the number of setting items settable in the advanced mode is larger than those in the home mode, in the advanced mode, a user can perform relatively detailed setting associated with the scanning function or the printing function, according to the purpose or taste of the user. In contrast with this, for example, since the number of setting items settable in the home mode is smaller than that in the advanced mode, in the home mode, a user can use the scanning function or the printing function by a simple operation.

For example, if a user boots the driver 100 for the first time, the main screen 12 of FIG. 4 is displayed next to the mode selection screen 11. Also, the main screen 12 is first displayed if the driver 100 is booted for the second or subsequent time. The driver 100 of the present illustrative aspect can control a plurality of apparatuses (for example, the scanner 300 and the multi-function apparatus 400 (FIG. 1)). The main screen 12 includes a pull-down menu PM1 for selecting an apparatus to be used by the user. The pull-down menu PM1 includes a plurality of options representing a plurality of available apparatuses (for example, the scanner 300 and the multi-function apparatus 400 (FIG. 1)) registered in advance in the driver 100. In the illustrative aspect of FIG. 4, as options, the model name "MODEL A" of the scanner 300 and the model name "MODEL B" of the multi-function apparatus 400 are shown. The user can operate the pull-down menu PM1 so as to select one option from the plurality of options, thereby setting an apparatus to be used. An apparatus represented by a model name selected by using the pull-down menu PM1 is also referred to as a selected apparatus.

The main screen 12 includes one or more buttons which are displayed according to the selected apparatus. Each button indicates executable image processing. In the illustrative aspect of FIG. 4, a case where the model name "MODEL B", that is, the multi-function apparatus 400 has been selected is shown, and a button BT3 representing the scanning function, and a button BT4 representing the printing function has been displayed. The user can push the button BT3 or BT4, thereby designating a function to be used. Also, in the present illustrative aspect, only a case where the user uses the scanning function, that is, a case where the button BT3 is pushed will be described, and a case where the user uses the printing function, that is, a case where the button BT4 is pushed will not be described.

The scan setting screen 13 of the FIG. 5 is displayed, for example, if the button BT3 is pushed in the main screen 12. The scan setting screen 13 includes a plurality of UI elements for a plurality of kinds of setting associated with the scanning function. Specifically, the scan setting screen 13 includes four pull-down menus PM2 to PM5, a field F1, and a slide bar SB.

The pull-down menu PM2 is used for designating a saving format for a compressed file to be generated. Specifically, the pull-down menu PM2 includes a plurality of options which includes an option representing "PDF", and an option representing "HIGH COMPRESSION PDF". The user designates one option from the plurality of options.

The pull-down menu PM3 is used for setting a resolution for scan data to be generated. The pull-down menu PM3 includes a plurality of options representing a plurality of resolutions. The user selects one option from the plurality of options. The plurality of resolutions represented by the plurality of options includes six resolutions, for example, 1200 dpi, 600 dpi, 300 dpi, 200 dpi, 150 dpi, and 100 dpi. Each option of FIG. 5 indicates one numerical value (for example, 1200 dpi). However, this one numerical value indicates both of a resolution in a scanning direction, and a resolution in a direction perpendicular to the scanning direction. For example, an option representing 1200 dpi indicates that both of the resolution in the scanning direction and the resolution in the direction perpendicular to the scanning direction are 1200 dpi.

The pull-down menu PM4 is used for setting the number of colors for scan data to be generated. The pull-down menu PM4 includes a plurality of options representing a plurality of numbers of colors. The user selects one option from the plurality of options. The plurality of options representing the plurality of numbers of colors includes, for example, an option "COLOR" (for example, about 16700000 colors (256 gradation levels for each of R, G, and B components), and an option "MONOCHROME" (for example, 256 gradation levels for gray).

The pull-down menu PM5 is used for setting the size of documents to be read for generating scan data. The pull-down menu PM5 includes a plurality of options representing a plurality of document sizes. The user selects one option from the plurality of options. The plurality of document sizes represented by the plurality of options includes, for example, an A3 size, an A4 size, an A5 size, and a postcard size.

The field F1 is used for inputting a file name for a compressed file to be generated.

The slide bar SB is used for designating a compression level. The slide bar SB includes a bar BR, and a slider SD which moves along the bar BR in response to an operation of the user. The slider SD can move to any one of seven specific positions P1 to P7 along the bar BR. The user can move the slider SD to a position, corresponding to a desired compression level, of the specific positions P1 to P7, thereby designating one compression level. As described above, as the compression level increases, the data size of a compressed file decreases. Therefore, designation of a compression level means designation of the level of the data size of a compressed file.

The scan setting screen 13 further includes a button BT5 for canceling display of the scan setting screen 13, thereby issuing an instruction for returning to the main screen 12, a button BT6 for issuing an instruction for performing scan, and a button BTD for detailed setting. For example, the user performs desired designation or selection with respect to the plurality of above described options, and sets documents on the platen of the selected apparatus (for example, the scanner 300 or the multi-function apparatus 400), and then pushes the button BT6. In this way, the user can instruct a desired apparatus to perform scan in desired settings.

The detail setting screen 14 of FIG. 6 is displayed, for example, if the button BTD for detailed setting is pushed in the scan setting screen 13 of FIG. 5. The detail setting screen 14 includes four check boxes CB1 to CB4 which are used for relatively detailed setting associated with the scanning function. The check box CB1 is a check box for selecting an option representing that inclination correction for correcting the inclinations of scan images is performed, and an option representing that inclination correction is not performed. The check box CB2 is a check box for selecting an option representing that if a blank document is read, scan data representing the corresponding document is not generated (blank paper removal), and an option representing that blank paper removal is not performed, that is, scan data representing every document is generated regardless of whether the corresponding document is blank or not. The check box CB3 is a check box for selecting an option representing that a ground color removing process of removing the ground color of a document, and an option representing that the ground color removing process is not performed. The check box CB4 is a check box for selecting options associated with the image quality of scan data. Specifically, the check box CB4 is a check box for selecting an option representing that the image quality of characters is prioritized (character priority), and an option representing that the image quality of photographs is prioritized (photograph priority). Inputting of a check mark to the check box CB4 means that the option representing character priority is selected, and keeping of the check box CB4 in the blank state implicitly means that photograph priority is selected. Also, for example, instead of the check box CB4, explicitly, a pull-down menu including an option representing character priority and an option representing photograph priority may be used.

A-4. Image Processing

Figure 7:
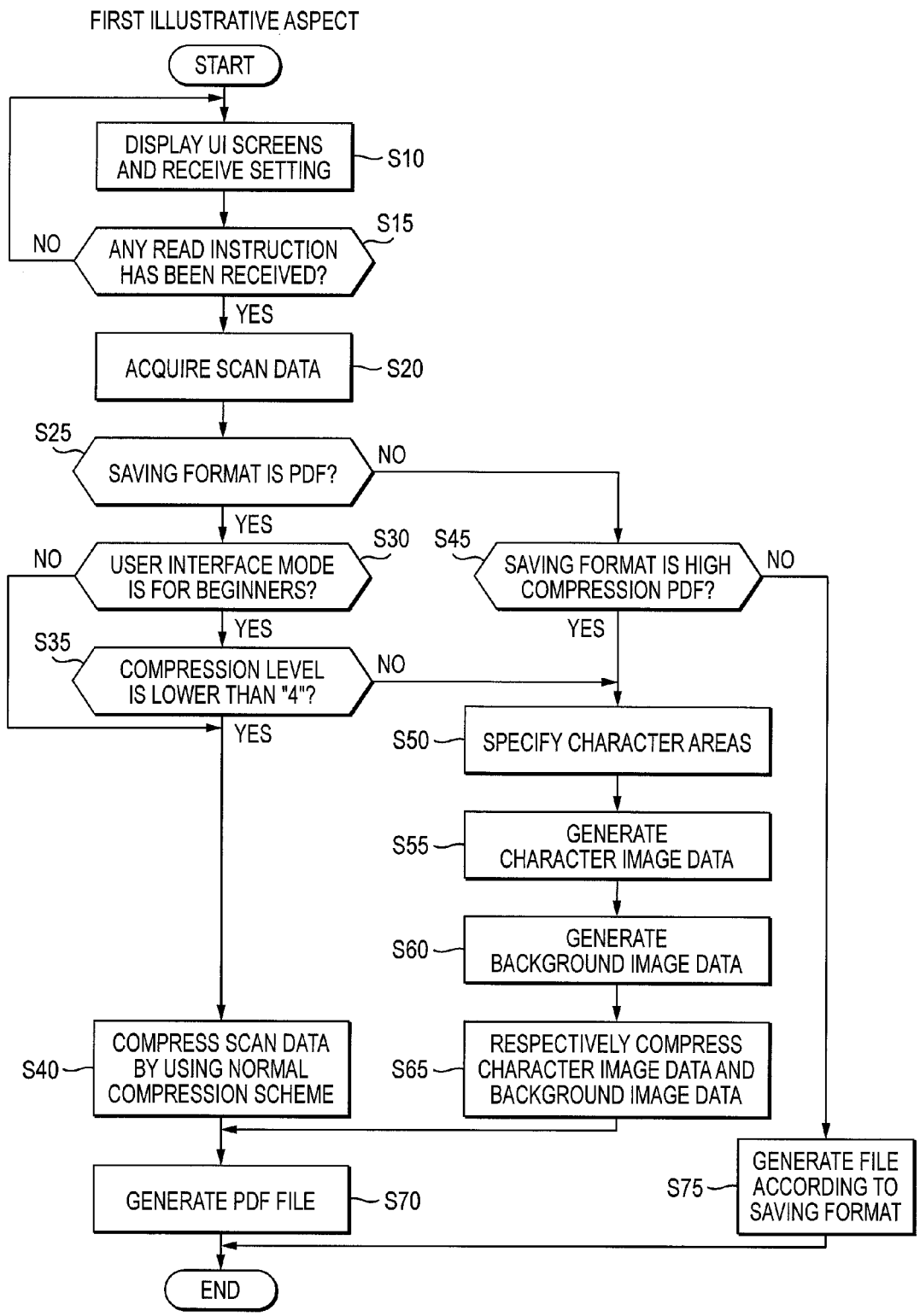
FIG. 7 is a flow chart illustrating image processing of a first illustrative aspect.

FIG. 7 is a flow chart illustrating image processing of the first illustrative aspect. For example, if the user activates the driver 100 in order to use the scanner 300 or the multifunction apparatus 400 to acquire scan data, the image processing is performed.

In Step S10, the receiving unit 110 displays the UI screens 11 to 14 of FIGS. 3 to 6 on the display unit 260 and receives instructions of the user with respect to various kinds of setting.

In Step S15 of FIG. 7, the receiving unit 110 determines whether any scan performance instruction (scan instruction) has been received. Specifically, in a case where the button BT6 of the scan setting screen 13 of FIG. 5 has been pushed, the receiving unit 110 determines that a scan instruction has been received. In a case where any scan instruction has not been received ("NO" in Step S15), in Step S10, the CPU 210 keeps the display of the UI screen, and continues receiving the above described setting.

In a case where a scan instruction has been received ("YES" in Step S15), in Step S20, the scan data acquiring unit 120 acquires scan data according to the options designated or selected on the scan setting screen 13. Specifically, the scan data acquiring unit 120 controls a selected apparatus such that the selected apparatus reads a document at the same optical resolution as the resolution (also referred to as set resolution) selected in the scan setting screen 13 by the user, whereby the scan data acquiring unit acquires the scan data having the same data resolution as the set resolution, from the selected apparatus. Alternatively, the scan data acquiring unit 120 may control the selected apparatus such that the selected apparatus reads the document at an optical resolution different from the set resolution. In this case, the scan data acquiring unit 120 acquires scan data having the resolution different from the set resolution, from the selected apparatus, and performs a resolution converting process on the corresponding scan data, thereby acquiring scan data having the same data resolution as the set resolution. The data resolution is a value (whose unit is, for example, dpi) representing the number of pixels in a specific direction (the scanning direction or the direction perpendicular to the scanning direction) of a scan image representing by the scan data, with reference to the length (whose unit is, for example, inch) of the document in the corresponding direction. Also, in a case where resolution information is associated with a compressed file to be generated later, resolution information representing the data resolution is associated. Setting of the resolution selected by the user is setting of the data resolution in the present illustrative aspect, and can be expressed as setting of a resolution represented by the resolution information to be associated with a compressed file to be generated.

In a case where the option "COLOR" has been selected in the pull-down menu PM4 (FIG. 5), the scan data is RGB image data. The RGB image data include the values of three color components R, G, and B (for example, an R value, a G value, and a B value in 256 grayscale) for each pixel. Also, in a case where the option "MONOCHROME" has been selected in the pull-down menu PM4, the scan data is image data including one gray component value (for example, 256 grayscale) for each pixel.

Figure 8A:
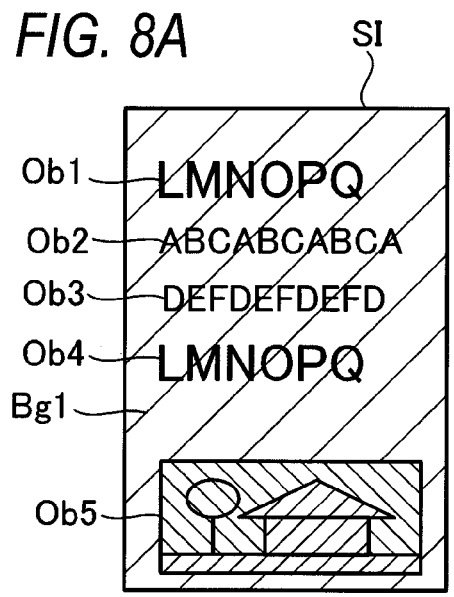
FIGS. 8A to 8D are views illustrating illustrative aspects of images which can be used in the image processing.

FIGS. 8A to 8D are views illustrating illustrative aspects of images which can be used in the image processing of the present illustrative aspect. FIG. 8A is a view illustrating an illustrative aspect of a scan image SI which is represented by scan data acquired in Step S20. The scan image SI includes a ground Bg1, and five objects Ob1 to Ob5, that is, character objects Ob1 to Ob4 and a photograph object Ob5.

In Step S25, the file generating unit 130 determines whether the saving format designated by using the pull-down menu PM2 (FIG. 5) is "PDF". In a case where the designated saving format is "PDF" ("YES" in Step S25), in Step S30, the file generating unit 130 determines whether the user interface mode selected in the mode selection screen 11 (FIG. 3) is a mode intended for beginners. Specifically, in a case where the home mode has been selected, it is determined that the selected user interface mode is a mode intended for beginners. Meanwhile, in a case where the advanced mode has been selected, it is determined that the selected user interface mode is not a mode intended for beginners, in other words, that the selected user interface mode is a mode intended for intermediates or advanced users.

In a case where the selected user interface mode is a mode intended for beginners ("YES" in Step S30), in Step S35, the file generating unit 130 determines whether the compression level designated by using the slide bar SB (FIG. 5) is lower than "4". A compression level lower than "4", that is, a relatively low compression level indicates that the data size of a compressed file to be generated is relatively large.

In a case where the selected user interface mode is not a mode intended for beginners ("NO" in Step S30), in Step S40, the file generating unit 130 compresses the scan data by using the normal compression scheme. Also, in a case where the selected user interface mode is a mode intended for beginners ("YES" in Step S30), and the designated compression level is lower than "4" ("YES" in Step S35), in Step S40, the file generating unit 130 compresses the scan data by using the normal compression scheme. That is, the scan data is compressed by a JPEG compression process, whereby compressed data is generated. In the JPEG compression process, a quantization table defined in association with the designated compression level in the compression parameter table PT1 (FIG. 2) are used.

In a case where the designated saving format is not "PDF" ("NO" in Step S25), in Step S45, the file generating unit 130 determines whether the designated saving format is "HIGH COMPRESSION PDF".

In a case where the designated saving format is "HIGH COMPRESSION PDF" ("YES" in Step S45), a series of processes of compressing the scan data by using the high compression scheme is performed in Steps S50 to S65. Also, even in a case where the selected user interface mode is a mode intended for beginners ("YES" in Step S30), and the designated compression level is not lower than "4" ("NO" in Step S35), the series of processes of compressing the scan data by using the high compression scheme is performed in Steps S50 to S65. A compression level equal to or higher than "4", that is, a relatively high compression level indicates that the data size of a compressed file to be generated is relatively small.

Figure 8B:
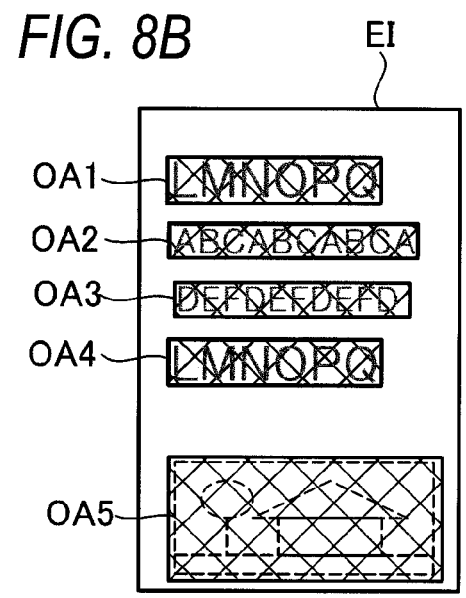

In Step S50, the file generating unit 130 specifies character areas in the scan image SI (FIG. 8A). Specifically, the file generating unit 130 applies an edge detection filter, such as a Sobel filter, to the scan data, thereby generating edge image data representing an edge image EI (FIG. 8B). The file generating unit 130 specifies areas of the edge image EI where edge intensity is higher than a reference value, and specifies the corresponding areas as object areas. In the illustrative aspect of FIG. 8B, five object areas OA1 to OA5 corresponding respectively to the five objects Ob1 to Ob5 of the scan image SI have been specified inside the edge image EI.

The file generating unit 130 determines whether each object area is a character area, on the basis of the color distributions of the object areas OA1 to OA5 in the scan image SI. Specifically, the file generating unit 130 computes the number C of colors of the corresponding object area, on the basis of histogram data obtained by classifying a plurality of pixels in the corresponding object area for each luminance value. Specifically, in a case where the number of pixels classified for a notable pixel value is equal to or larger than a threshold value, the CPU 210 specifies the corresponding notable pixel value as a pixel value to be counted. The CPU 210 computes the total number of pixel values to be counted, as the number C of colors. The file generating unit 130 classifies the plurality of pixels included in the object area into background pixels having colors similar to the color (background color) around the object area and object pixels other than the background pixels, and computes the ratio D of the object pixels to the background pixels. As for the character objects, the number C of colors and the ratio D of object pixels tend to be smaller, as compared to objects other than the character objects. In a case where the number C of colors of an object area which is the target of the determination is smaller than a first threshold value, and the ratio D of object pixels is smaller than a second threshold value, the corresponding object area is determined as a character area. In the illustrative aspect of FIG. 8B, the object areas OA1 to OA4 corresponding respectively to the character objects Ob1 to Ob4 are determined as character areas, but the object area OA5 corresponding to the photograph object Ob5 is not determined as a character area. As a result, four character areas OA1 to OA4 are specified.

Incidentally, as the method of specifying character areas, various known methods can be used.

In Step S55, the file generating unit 130 generates character image data representing a character image TI (FIG. 8C) included in the scan image SI. Specifically, the file generating unit 130 classifies the plurality of pixels included in the scan image SI (FIG. 8A), into object pixels (also referred to as character component pixels) included in the specified character areas OA1 to OA4, and non-character pixels other than the character component pixels. As a result, binary image data representing the character image TI (FIG. 8C) is generated as the character image data.

Figure 8C:
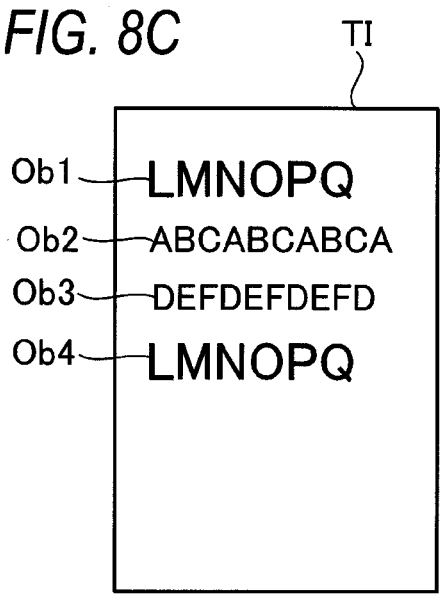

As shown in FIG. 8C, in the character image TI, the character objects Ob1 to Ob4 included in the scan image SI (FIG. 8A) are shown, but elements other than characters, that is, the ground Bg1 and the photograph object Ob5 are not shown.

In Step S60, the file generating unit 130 generates background image data by using the scan data and the character image data. Specifically, the file generating unit 130 changes the color values of pixels, which are included in the plurality of pixels of the scan image SI (FIG. 8A) and correspond to the character component pixels included in the character image TI, to a value representing the background color around the character areas. As a result, background image data representing a background image BI (FIG. 8D) obtained by eliminating the characters from the scan image SI is generated.

Figure 8D:
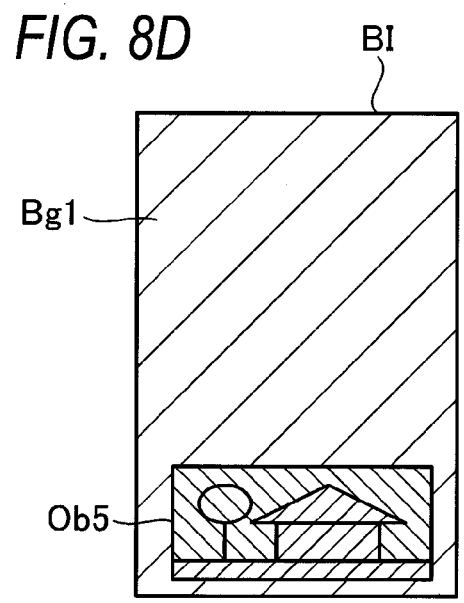

As shown in FIG. 8D, in the background image BI, the character objects Ob1 to Ob4 included in the scan image SI (FIG. 8A) are not shown, but elements other than characters, that is, the ground Bg1 and the photograph object Ob5 are shown. Also, the background image data is image data (for example, RGB image data) having the same color components as those of the scan data, and having the same number of gradation levels as that of the scan data.

In Step S65, the file generating unit 130 respectively compresses the character image data and the background image data, thereby generating two compressed data. Parameters for compression are acquired from the compression parameter table PT2 (FIG. 2). Specifically, the file generating unit 130 compresses the character image data by an MMR scheme, thereby generating compressed character image data. As shown in the compression parameter table PT2, when the character image data is compressed, a process of decreasing the resolution of the character image data is not performed, so that the resolution of the scan data is kept. The file generating unit 130 compresses the background image data by using a JPEG scheme, thereby compressed background image data. The compression using the JPEG scheme includes a process of converting the resolution of the background image data into the resolution defined in association with the designated compression level in the compression parameter table PT1 (FIG. 2), and a process of compressing the converted background image data by using the quantization table defined in association with the designated compression level.

In Step S70, the file generating unit 130 generates a PDF file by using the compressed data. Specifically, in a case where the normal compression scheme is used as the compression scheme, the file generating unit 130 generates one PDF file containing one compressed data item generated in Step S40. Also, in a case where the high compression scheme is used as the compression scheme, the file generating unit 130 generates one PDF file containing the two compressed data (the compressed character image data and the compressed background image data) generated in Step S65. Also, in the PDF file generated in the case where the high compression scheme is used, the compressed background image data is stored as image data representing a background layer, and the compressed character image data is stored as image data representing a foreground layer in association with a character color value. As the character color value, the average color value of the character component pixels specified in the character image TI (FIG. 8C) can be used, for example. If the PDF file is generated, the image processing finishes.

In a case where the designated saving format is "HIGH COMPRESSION PDF" ("NO" in Step S45), the designated saving format is a saving format different from "PDF" and "HIGH COMPRESSION PDF". The file generating unit 130 generates a file according to the designated saving format in Step S75, and finishes the image processing.

According to the image processing of the present illustrative aspect described above, in a first case where "PDF" has been designated as the saving format, and the advanced mode intended for intermediates and advanced users has been selected as a user interface mode ("YES" in Step S25, and "NO" in Step S30), in Steps S40 and S70, a compressed file is generated by using the normal compression scheme, regardless of the compression level designated by using the slider SD (FIG. 5). Also, in a second case where "PDF" has been designated as the saving format, and the home mode intended for beginners has been selected as a user interface mode ("YES" in Step S25, and "YES" in Step S30), in Step S35, any one compression scheme of the normal compression scheme and the high compression scheme is selected according to the compression level designated by using the slider SD (FIG. 5). Thereafter, in Steps S40 and S70, or Steps S50 to S70, a compressed file is generated by using the selected compression scheme. As a result, although the user designates "PDF" as the saving format, the user can select different options with respect to setting of a user interface mode, thereby using different compression schemes. As a result, a PDF file appropriate for the user can be generated. This will be described below in more detail.

In a case of using the normal compression scheme, scan data is compressed by lossy compression (specifically, JPEG compression), without being divided into character image data and background image data. Therefore, as the compression level becomes higher, the blur of the edges of the characters in the scan image increases. Therefore, in the case of using the normal compression scheme, the readability of the characters is likely to decrease. Also, for example, a scan image having a large amount of characters has a relatively large number of high-frequency components. Therefore, in the case of using the normal compression scheme, even if the compression level is high, the data size of a compressed file may not become sufficiently small.

In a case of using the high compression scheme, scan data is divided into character image data and background image data, which are respectively compressed. At this time, the character image data which is binary data is losslessly compressed. Therefore, the edges of characters become sharp, regardless of the compression level, and thus the readability of the characters is kept. Also, the background image data is compressed by lossy compression. Since the background image data does not include any character, the background image data has a relatively small number of high-frequency components. Therefore, if the compression level is set to be high, the data size of the compressed background image data is likely to become sufficiently small. Therefore, in the case of using the high compression scheme, if the compression level is set to be high, the data size of a compressed file is likely to become sufficiently small.

Therefore, in view of the readability of characters and the data sizes of compressed files, it can be considered that, especially in a case of compressing scan data representing a scan image including characters at a high compression level, it is preferable to use the high compression scheme rather than the normal compression scheme.

However, the blur of the edges of characters may cause the characters to look better as compared to a case where the edges of the characters are sharp. Therefore, in a case where the blur of the edges of characters does not damage the readability of the characters, such as a case where characters are relatively large, it may be preferable that the edges of the characters should be blurred. Also, in a case where a scan image does not include any character or where a scan image includes a relatively small number of characters, even if the high compression scheme is used, the data size of a compressed file may not become sufficiently small.

Due to such circumstances, it may be relatively difficult to properly use the normal compression scheme and the high compression scheme in view of the characteristics of scan images and the like. Especially, it is likely that it is difficult for beginners having a relatively low level of knowledge about generation of scan data to properly use the normal compression scheme and the high compression scheme.

In the present illustrative aspect, in the second case where the above described "PDF" has been designated, and the home mode has been selected ("YES" in Step S25, and "YES" in Step S30), since the user is likely to be a beginner, a compression scheme is automatically selected according to the compression level and is used to generate a compressed file. More specifically, in the second case, if the compression level is lower than "4" ("YES" in Step S35), in Step S40, a compressed file is generated by using the normal compression scheme. Meanwhile, in the second case, if the compression level is not lower than "4" ("NO" in Step S35), in Steps S50 to S65, a compressed file is generated by using the high compression scheme. Therefore, even though the user is a beginner, an appropriate compressed file can be generated.

Meanwhile, it can be considered that intermediates or advanced users having a relatively high level of knowledge about generation of scan data can properly use the normal compression scheme and the high compression scheme. Also, intermediates or advanced users may be willing to properly use the normal compression scheme and the high compression scheme on the basis of their judgments. Therefore, intermediates or advanced users may want the compression schemes not to be automatically switched regardless of their judgments. In the present illustrative aspect, in the first case where the above described "PDF" has been designated, and the advanced mode has been selected ("YES" in Step S25, and "NO" in Step S30), since the user is likely to be an intermediate or an advanced user, in Step S40, a compressed file is generated by using the normal compression scheme, regardless of the compression level. Therefore, even though the user is an intermediate or an advanced user, an appropriate compressed file can be generated.

Further, in a case where "HIGH COMPRESSION PDF" has been designated as the saving format ("YES" in Step S45), in Steps S50 to S65, the file generating unit 130 generates a compressed file by using the high compression scheme, regardless of the selected user interface mode and the designated compression level. As a result, a compressed file appropriate for the user is generated according to the designated saving format. For example, in a case where a user who will select the advanced mode wants to acquire a compressed file generated by using the normal compression scheme, the user needs to designate "PDF" as the saving format, and in a case where the user wants to acquire a compressed file generated by using the high compression scheme, the user needs to designate "HIGH COMPRESSION PDF" as the saving format (FIG. 5). As a result, for example, intermediates and advanced users can properly use the normal compression scheme and the high compression scheme in view of the characteristics of scan images and the like.

In the first illustrative aspect, with respect to the options selectable in the mode selection screen 11 (FIG. 3), the option representing the advanced mode is an illustrative aspect of a first-kind option, and the option representing the home mode is an illustrative aspect of a second-kind option. Also, in the first illustrative aspect and also second to fifth illustrative aspects (to be described below), "PDF" included in the pull-down menu PM2 is an illustrative aspect of a specific saving format, and "HIGH COMPRESSION PDF" is an illustrative aspect of a predetermined saving format different from the specific saving format.

Also, in the first illustrative aspect, the options included in the scan setting screen 13 can be appropriately omitted except for the options for designating a saving format and the options for designating a compression level.

B. Second Illustrative Aspect

FIG. 9 is a flow chart illustrating image processing of a second illustrative aspect. The image processing of the second illustrative aspect of FIG. 9 is different from the image processing of the first illustrative aspect of FIG. 7 in that Step S30B is performed in place of Step S30 of FIG. 7. The other Steps of FIG. 9 are the same as Steps shown in FIG. 7 and having the same reference symbols as those in FIG. 9.

In Step S30B, the file generating unit 130 determines whether the model of the selected apparatus (selected model) is the multi-function apparatus. That is, the file generating unit 130 determines whether the model name represented by the option selected by using the pull-down menu PM1 of the main screen 12 (FIG. 4) is a model name representing the multi-function apparatus or a model name representing the dedicated scanner. The driver program 241 (FIG. 2) includes a table (not shown) in which each of the plurality of corresponding model names has been stored in association with information on whether the corresponding model name is the model name of the multi-function apparatus or the model name of the dedicated scanner. With reference to the corresponding table, the file generating unit 130 determines whether the selected model is the multi-function apparatus or the dedicated scanner.

In a case where the selected model is the multi-function apparatus ("YES" in Step S30B), the process proceeds to Step S35. Meanwhile, in a case where the selected model is not the multi-function apparatus, that is, a case where the selected model is the dedicated scanner ("NO" in Step S30B), the process proceeds to Step S40.

According to the image processing of the second illustrative aspect described above, in a case where "PDF" has been designated as the saving format, and the dedicated scanner has been selected as an apparatus to be used to generate scan data ("YES" in Step S25, and "NO" in Step S30B), in Steps S40 and S70, a compressed file is generated by using the normal compression scheme, regardless of the compression level. Also, in a case where "PDF" has been designated as the saving format, and the multi-function apparatus has been selected as an apparatus to be used to generate scan data ("YES" in Step S25, and "YES" in Step S30B), in Step S35, any one compression scheme of the normal compression scheme and the high compression scheme is selected according to the compression level. As a result, although the user designate "PDF" as the saving format, the user can select different options with respect to setting of an apparatus to be used to generate scan data, thereby using different compression schemes. As a result, a PDF file appropriate for the user can be generated. This will be described below in more detail.

As described with respect to the first illustrative aspect, it may be relatively difficult to properly use the normal compression scheme and the high compression scheme in view of the characteristics of scan images and the like. Especially, it is likely that it is complicated and difficult for users who are not particular about generation of scan data to properly use the normal compression scheme and the high compression scheme. Also, such users are highly likely to have a relatively low level of knowledge about generation of scan data. Therefore, it can be considered that a user who uses the scanning function of the multi-function apparatus is more likely to be less particular about generation of scan data as compared to a user who uses the dedicated scanner.

In the second illustrative aspect, in a case where "PDF" has been designated as the saving format and where the multi-function apparatus has been selected as an apparatus to be used to generate scan data ("YES" in Step S25, and "YES" in Step S30B), a compression scheme is automatically selected according to the compression level and is used to generate a compressed file. As a result, for a user who is not particular about generation of scan data, an appropriate compressed file can be generated.

Meanwhile, it can be considered that users who are particular about generation of scan data is likely to have a relatively high level of knowledge about scan data and can properly use the normal compression scheme and the high compression scheme. Also, users who are particular about generation of scan data may be willing to properly use the normal compression scheme and the high compression scheme on the basis of their judgments. Therefore, users who are particular about generation of scan data may want the compression schemes not to be automatically switched regardless of their judgments.

In the present illustrative aspect, in a case where "PDF" has been designated and where the dedicated scanner has been selected as an apparatus to be used to generate scan data ("YES" in Step S25, and "NO" in Step S30B), in Step S40, a compressed file is generated by using the normal compression scheme, regardless of the compression level. Therefore, even though the user is particular about generation of scan data, a compressed file appropriate for the user can be generated.

In the second illustrative aspect, with respect to the options selectable in the pull-down menu PM1 of the main screen 12 (FIG. 4), the option representing the model name of the dedicated scanner is an illustrative aspect of the first-kind option, and the option representing the model name of the multi-function apparatus is an illustrative aspect of the second-kind option.

In the second illustrative aspect, the options included in the scan setting screen 13 can be appropriately omitted except for the options for designating a saving format and the options for designating a compression level.

C. Third Illustrative Aspect

Figure 10:
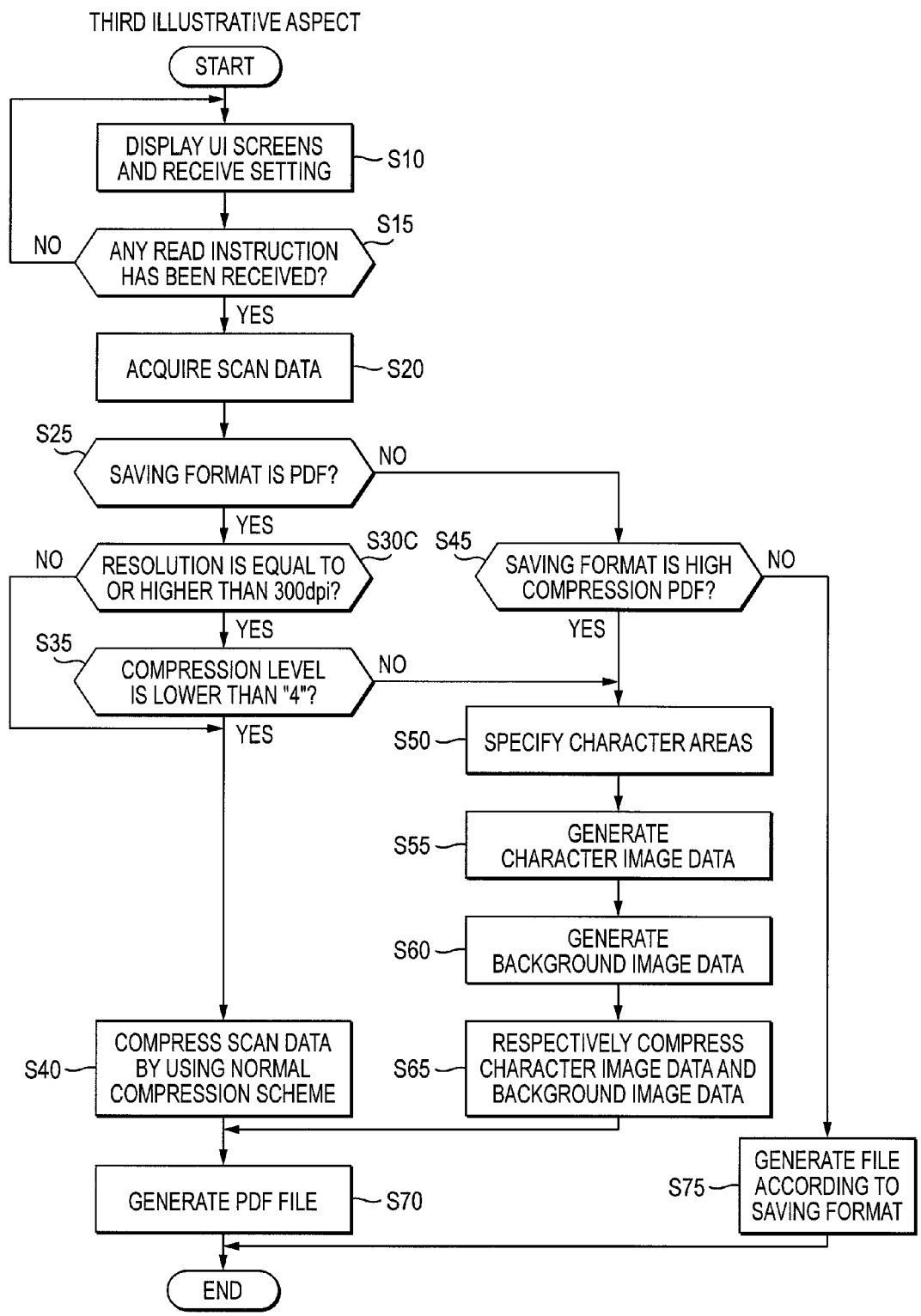
FIG. 10 is a flow chart illustrating image processing of a third illustrative aspect.

FIG. 10 is a flow chart illustrating image processing of a third illustrative aspect. The image processing of the third illustrative aspect of FIG. 10 is different from the image processing of the first illustrative aspect of FIG. 7 in that Step S30C is performed in place of Step S30 of FIG. 7. The other Steps of FIG. 10 are the same as Steps shown in FIG. 7 and having the same reference symbols as those in FIG. 10.

In Step S30C, the file generating unit 130 determines whether the resolution selected by using the pull-down menu PM3 of the scan setting screen 13 is equal to or higher than 300 dpi.

In a case where the selected resolution is equal to or higher than 300 dpi ("YES" in Step S30C), the process proceeds to Step S35. Meanwhile, in a case where the selected resolution is lower than 300 dpi ("NO" in Step S30C), the process proceeds to Step S40.

According to the image processing of the third illustrative aspect described above, in a case where "PDF" has been designated as the saving format and where a relatively low resolution, specifically, a resolution lower than 300 dpi has been selected as the resolution of scan data ("YES" in Step S25, and "NO" in Step S30C), in Steps S40 and S70, a compressed file is generated by using the normal compression scheme, regardless of the compression level. Also, in a case where "PDF" has been designated as the saving format and where a relatively higher than resolution, specifically, a resolution equal to or higher than 300 dpi has been selected as the resolution of scan data ("YES" in Step S25, and "YES" in Step S30C), in Step S35, any one compression scheme of the normal compression scheme and the high compression scheme is selected according to the compression level. As a result, although the user designates "PDF" as the saving format, the user can select different options with respect to setting of the resolution of scan data, thereby using different compression schemes to generate a PDF file appropriate for the user. This will be described below in more detail.

As described with respect to the first illustrative aspect, it may be relatively difficult for a user to properly use the normal compression scheme and the high compression scheme, in view of the characteristics of scan images and the like. Therefore, in a case where an advantage of using the high compression scheme instead of the normal compression scheme is relatively large, it can be considered that even if "PDF" is designated as the saving format, it is appropriate to automatically use the high compression scheme instead of the normal compression scheme.

Here, as described with respect to the first illustrative aspect, especially, in a case of compressing scan data representing a scan image including characters by using the high compression scheme, if the compression level is set to be high, the data size of a compressed file is likely to become sufficiently small. Therefore, in a case where the data size of a compressed file tends to become large, if the designated compression level is relatively high, an advantage of using the high compression scheme capable of reducing the data size of a compressed file is relatively large. In a case where the resolution of scan data is relatively high, since the number of pixels of the scan data becomes relatively large, the data size of a compressed file tends to become large.

In the third illustrative aspect, in a case where "PDF" is designated as the saving format, where a relatively high resolution is selected as the resolution of scan data, and where a relatively high compression level is designated, a compressed file is generated by using the high compression scheme. Meanwhile, in a case where "PDF" is designated as the saving format, if a relatively low resolution is selected as the resolution of scan data or a relatively high compression level is designated, a compressed file is generated by using the normal compression scheme. As a result, in a case where it can be considered that an advantage of using the high compression scheme is especially high, even if "PDF" is designated as the saving format, the high compression scheme is automatically used. Therefore, for the user, an appropriate compressed file can be generated.

In the third illustrative aspect, with respect to the options selectable by using the pull-down menu PM3 of scan setting screen 13 (FIG. 5), the options representing resolutions lower than 300 dpi are illustrative aspects of the options capable of making the number of pixels of scan data relatively small and the first-kind option. Also, the options representing resolutions equal to or higher than 300 dpi are illustrative aspects of the options capable of making the number of pixels of scan data relatively large and the second-kind option.

In the third illustrative aspect, the options included in the scan setting screen 13 can be appropriately omitted except for the options for designating a saving format, the options for designating a compression level, and the options for selecting a resolution.

D. Fourth Illustrative Aspect

Figure 11:
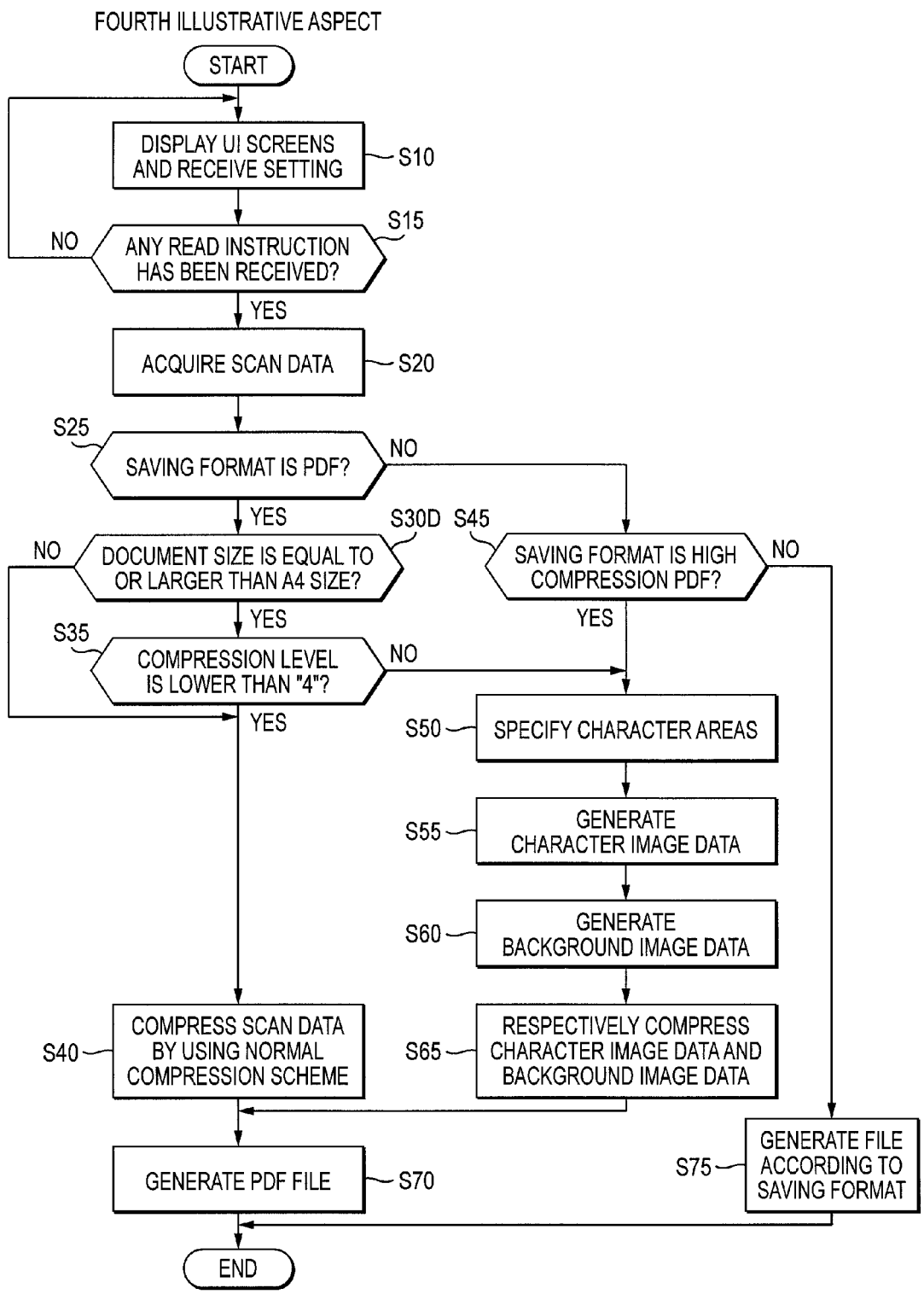
FIG. 11 is a flow chart illustrating image processing of a fourth illustrative aspect.

FIG. 11 is a flow chart illustrating image processing of a fourth illustrative aspect. The image processing of the third illustrative aspect of FIG. 11 is different from the image processing of the first illustrative aspect of FIG. 7 in that Step S30D is performed in place of Step S30 of FIG. 7. The other Steps of FIG. 11 are the same as Steps shown in FIG. 7 and having the same reference symbols as those in FIG. 11.

In Step S30D, the file generating unit 130 determines whether the document size selected by using the pull-down menu PM5 of the scan setting screen 13 is equal to or larger than the A4 size.

In a case where the selected document size is equal to or larger than the A4 size ("YES" in Step S30D), the process proceeds to Step S35. Meanwhile, in a case where the selected document size is smaller than the A4 size ("NO" in Step S30D), the process proceeds to Step S40.

According to the image processing of the fourth illustrative aspect described above, in a case where "PDF" is designated as the saving format and where a relatively small document size, specifically, a size smaller than the A4 size is selected as the size of a document to be read ("YES" in Step S25, and "NO" in Step S30D), in Steps S40 and S70, a compressed file is generated by using the normal compression scheme, regardless of the compression level. Also, in a case where "PDF" is designated as the saving format and where a relatively large document size, specifically, a size equal to or larger than the A4 size is selected as the size of a document to be read ("YES" in Step S25, and "YES" in Step S30D), in Step S35, any one compression scheme of the normal compression scheme and the high compression scheme is selected according to the compression level. As a result, although the user designates "PDF" as the saving format, the user can select different options with respect to setting of the size of a document to be read, thereby using different compression schemes. As a result, a PDF file appropriate for the user can be generated. This will be described below in more detail.

As described with respect to the third illustrative aspect, in a case where the data size of a compressed file tends to become large, if the designated compression level is relatively high, an advantage of using the high compression scheme capable of reducing the data size of a compressed file is relatively large. In a case where the size of a document to be read is relatively large, since the number of pixels of the scan data becomes relatively large, the data size of a compressed file tends to become large.

In the fourth illustrative aspect, in a case where "PDF" is designated as the saving format, where a relatively large size is selected as the size of a document to be read, and where a relatively high compression level is designated, a compressed file is generated by using the high compression scheme. Meanwhile, in a case where "PDF" is designated as the saving format, if a relatively small size is selected as the size of a document to be read or if a relatively low compression level is designated, a compressed file is generated by using the normal compression scheme. As a result, in a case where it can be considered that an advantage of using the high compression scheme is relatively high, even if "PDF" is designated as the saving format, the high compression scheme is automatically used. Therefore, for the user, an appropriate compressed file can be generated.

In the fourth illustrative aspect, with respect to the options selectable by using the pull-down menu PM5 of scan setting screen 13 (FIG. 5), the options representing sizes smaller than the A4 size are illustrative aspects of the options capable of making the number of pixels of scan data relatively small and the first-kind option. Also, the options representing sizes equal to or larger than the A4 size are illustrative aspects of the options capable of making the number of pixels of scan data relatively large and the second-kind option.

In the fourth illustrative aspect, the options included in the scan setting screen 13 can be appropriately omitted except for the options for designating a saving format, the options for designating a compression level, and the options for selecting a document size.

E. Fifth Illustrative Aspect

Figure 12:
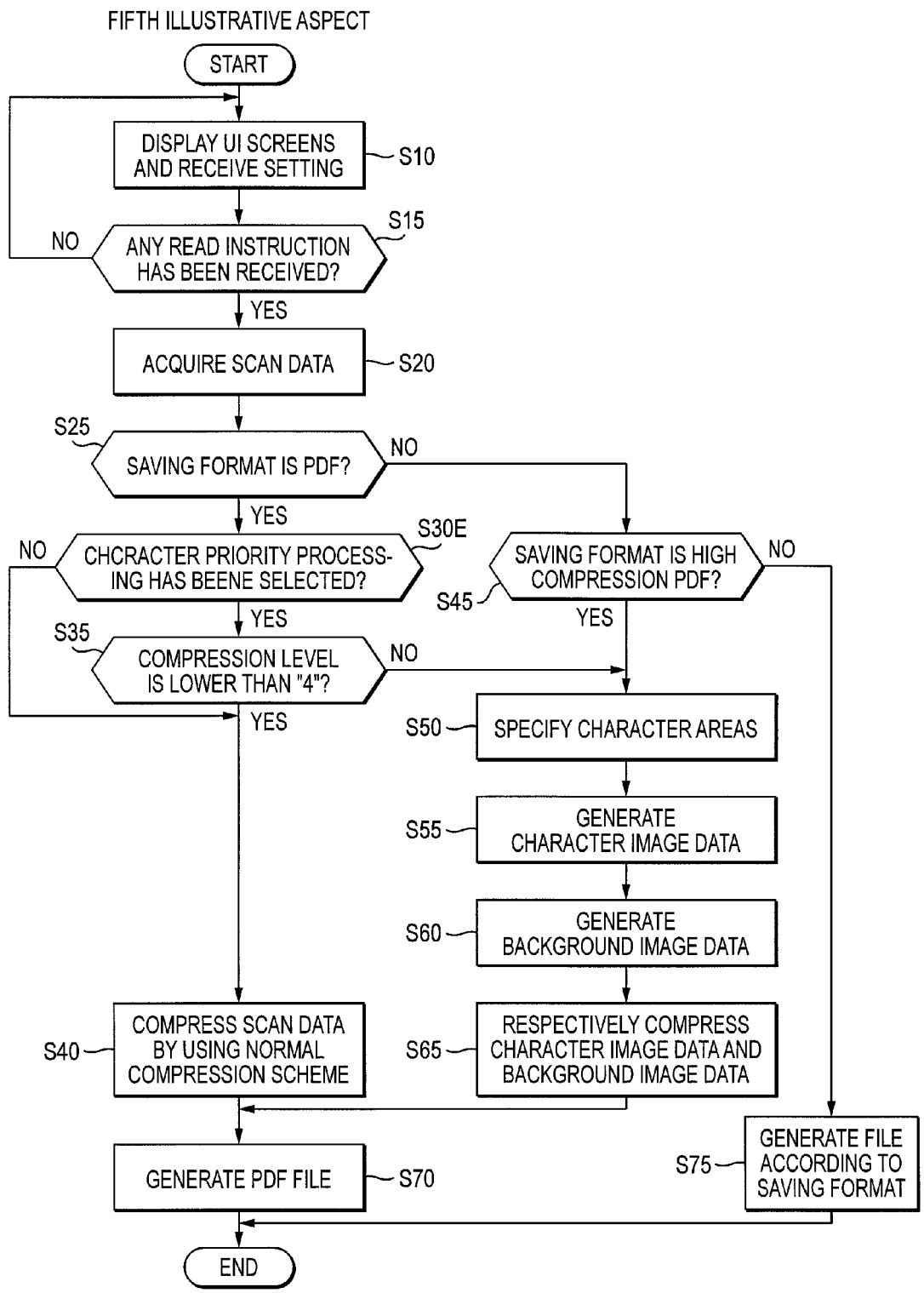
FIG. 12 is a flow chart illustrating image processing of a fifth illustrative aspect.

FIG. 12 is a flow chart illustrating image processing of a fifth illustrative aspect. The image processing of the third illustrative aspect of FIG. 12 is different from the image processing of the first illustrative aspect of FIG. 7 in that Step S30E is performed in place of Step S30 of FIG. 7. The other Steps of FIG. 12 are the same as Steps shown in FIG. 7 and having the same reference symbols as those in FIG. 12.

In Step S30E, the file generating unit 130 determines whether character priority has been selected by using the check box CB4 of the detail setting screen 14 (FIG. 6) associated with the scanning function. In other words, the file generating unit 130 determines whether the option representing character priority or the option representing the photograph priority has been selected.

In a case where character priority has been selected ("YES" in Step S30D), the process proceeds to Step S35. Meanwhile, in a case where photograph priority has been selected ("NO" in Step S30D), the process proceeds to Step S40.

According to the image processing of the fifth illustrative aspect described above, in a case where "PDF" has been designated as the saving format and where character priority has been selected with respect to the image quality of scan data ("YES" in Step S25, and "NO" in Step S30E), in Steps S40 and S70, a compressed file is generated by using the normal compression scheme, regardless of the compression level. Also, in a case where "PDF" has been designated as the saving format and where photograph priority has been selected with respect to the image quality of scan data ("YES" in Step S25, and "YES" in Step S30E), in Step S35, any one compression scheme of the normal compression scheme and the high compression scheme is selected according to the compression level. As a result, although the user designates "PDF" as the saving format, the user can select different options with respect to the image quality of scan data, thereby using different compression schemes. As a result, a PDF file appropriate for the user can be generated. This will be described below in more detail.

As described with respect to the first illustrative aspect, in a case where the normal compression scheme is used, especially if the compression level is relatively high, the readability of characters in a scan image is likely to decrease due to the blur of the edges of the characters. In a case where the high compression scheme is used, even if the compression level is relatively high, the readability of characters does not decrease. In a case where character priority is selected with respect to the image quality of scan data, it can be considered that a decrease in the readability of characters is against the intention of the user. Therefore, even in a case where "PDF" has been designated as the saving format, if there is a possibility that the readability of characters will decrease, it can be considered that it is appropriate to use the high compression scheme instead of the normal compression scheme.

In the fifth illustrative aspect, in a case where "PDF" has been designated as the saving format, where character priority has been selected as the image quality of scan data and where a relatively high compression level has been designated, a compressed file is generated by using the high compression scheme. Meanwhile, in a case where "PDF" has been designated as the saving format, if photograph priority is selected as the image quality of scan data or if a relatively low compression level is designated, a compressed file is generated by using the normal compression scheme. As a result, in a case where the normal compression scheme is used, if there is a possibility that the readability of characters will decrease against the intention of the user, although "PDF" has been designated as the saving format, the high compression scheme is automatically used. Therefore, for the user, an appropriate compressed file can be generated.

In the present illustrative aspect, as described above, in Step S30E, the file generating unit 130 determines whether character priority has been selected by using the check box CB4 of the detail setting screen 14 (FIG. 6) associated with the scanning function. Keeping of the check box CB4 in the blank state implicitly means that photograph priority is selected. In the fifth illustrative aspect, with respect to the options selectable by using the check box CB4 in the detail setting screen 14 (FIG. 6), the option representing photograph priority is an illustrative aspect of the first-kind option, and the option representing character priority is an illustrative aspect of the second-kind option.

F. Modifications (1) In the image processing of each of the above described illustrative aspects, as the first compression scheme and the second compression scheme, the normal compression scheme and the high compression scheme have been exemplified, respectively. However, the first compression scheme and the second compression scheme are not limited thereto. As the first compression scheme, a compression scheme obtained by combining a JPEG compression process and a compression process for degrading all or some of various attributes of image data, such as the number of pixels, the number of gradation levels, and the number of colors to be used, according to predetermined rules can be used. As the second compression scheme, any other compression scheme capable of reducing the data size of a compressed file while suppressing a decrease in image quality such as a decrease in readability of characters can be used. For example, the compression scheme for background image data may be different from that in each illustrative aspect, and for example, as the compression scheme for background image data, the same compression scheme as the modification of the first compression scheme described above may be used. Also, as the compression scheme for character image data, for example, a compression process obtained by combining a process of reducing the number of available colors (the number of bits of color data) with losslessly compression such as Deflate compression or the like may be used.

(2) The UI elements included in the UI screens 11 to 14 shown in FIGS. 3 to 6 are just illustrative aspects, and this disclosure is not limited thereto. For example, in the mode selection screen 11 of FIG. 3, the option representing the home mode and the option representing the advanced mode can be selected by using the radio buttons RB1 and RB2. However, the corresponding options may be selected by using a pull-down menu. Also, in the main screen 12 of FIG. 4, the plurality of options representing the plurality of model names can be selected by using the pull-down menu PM2. However, the corresponding options may be selected by using a plurality of radio buttons. Further, in the scan setting screen 13 of FIG. 5, the plurality of options can be selected by using the pull-down menus PM3 to PM5. However, the corresponding options may be selected by using a plurality of radio buttons. Also, in the detail setting screen 14 of FIG. 6, two options can be selected by using the check box CB4 (one of them can be selected by inputting a check mark in the check box CB4 and the other can be selected by making the check box CB4 blank). However, the corresponding options may be selected by using two radio buttons or may be selected by using a pull-down menu including the two options.

Also, in the mode selection screen 11 of FIG. 3, the option representing the home mode and the option representing the advanced mode may be selected by using a check box. For example, if a check mark is input to a predetermined check box, the option representing the advanced mode may be selected and if the predetermined check box is made blank, the option representing the home mode may be selected.

Also, in the scan setting screen 13, the UI element for designating the compression level is not limited to the slide bar SB. For example, a UI element for inputting the numerical value of a compression level to a predetermined input field may be used, or a plurality of radio buttons corresponding respectively to the plurality of compression levels may be used.

(3) In the second to fourth illustrative aspects, selection of a user interface mode may be impossible. Also, in the first, third, and fourth illustrative aspects, selection of an apparatus to be used to generate scan data may be impossible. That is, in the first, third, and fourth illustrative aspects, the driver 100 may be a driver dedicated for one apparatus (the dedicated scanner or the multi-function apparatus).

(4) In the first, third, and fourth illustrative aspects, the image processing function of the driver 100 is implemented by the computer 200. However, alternatively, the image processing function may be implemented by a control unit of an apparatus such as the multi-function apparatus or the dedicated scanner. In this case, the control unit may display the UI screens 11 to 14 of FIGS. 3 to 6, for example, on the display panel of the multi-function apparatus or the dedicated scanner. Alternatively, the control unit may provide web pages, for example, to a computer connected to the multi-function apparatus or the scanner, thereby displaying the UI screens 11 to 14 on the display unit of the computer. Also, in this case, since image processing is performed by one dedicated apparatus (the dedicated scanner or the multi-function apparatus), selection of an apparatus to be used to generate scan data may be omitted.

Also, the control unit of the apparatus such as the multi-function apparatus or the dedicated scanner, and a server connected to the control unit may implement the above described image processing function in conjunction with each other. In this case, for example, the control unit of the apparatus performs a user interface function and a scan data generating function, and transmits the corresponding scan data and setting information received from a user, to the predetermined server. The server generates a compressed file by using the scan data, and transmits the generated compressed file to the control unit of the apparatus. In this case, a system including the control unit of the apparatus and the sever implementing the image processing function corresponds to the image processing apparatus.

(5) In the above described third illustrative aspect, in the case where "PDF" has been selected as the saving format, the compression schemes are automatically switched in response to an option selected with respect to setting of the resolution of scan data, and in the above described fourth illustrative aspect, in the case where "PDF" has been selected as the saving format, the compression schemes are automatically switched in response to an option selected with respect to setting of a document size. The third illustrative aspect and the fourth illustrative aspect may be combined such that in the case where "PDF" has been selected as the saving format, the compression schemes are automatically switched in response to M-number of options which are combinations of the options of the resolutions of scan data and the options of the document sizes. For example, in a case where the number of options for setting the resolution of scan data is P, and the number of options for setting a document size is Q, M which is the number of options which can be obtained by combining the resolution options with the size options is (P×Q). In a case where the square of the resolution (whose unit is, for example, dpi) selected for scan data is R, and the selected document size (area) is S (whose unit is, for example, square inch), the product (R×S) of R and S becomes an indicator representing the number of pixels of scan data.

Therefore, for example, in a case where "PDF" is selected as the saving format, where an option in which the value of (R×S) becomes equal to or larger than a threshold value TH is selected from the (P×Q)-number of options, and where a relatively high compression level is designated, the CPU 210 may generate a compressed file by using the high compression scheme. Further, in a case where "PDF" is selected as the saving format, if an option in which the value of (R×S) becomes smaller than the threshold value TH is selected from the (P×Q)-number of options or if a relatively low compression level is designated, the CPU 210 may generate a compressed file by using the normal compression scheme. The threshold value TH is set to the value of (R×S) obtained in a case where R is the square of 300 dpi and S is the area of the A4 size. In the present modification, of the (P×Q)-number of options, options in which the value of (R×S) becomes smaller than the threshold value TH are illustrative aspects of the first-kind option, and options in which the value of (R×S) becomes equal to or larger than the value TH are illustrative aspects of the second-kind option.

(6) The above described first to fifth illustrative aspects may be combined. For example, in a case where "PDF" is selected as the saving format, where the option representing the model name of the multi-function apparatus is selected with respect to setting of an apparatus to be used to generate scan data, where the option representing the home mode is selected with respect to setting of a user interface mode, and where a relatively high compression level is designated, the CPU 210 may generate a compressed file by using the high compression scheme. Further, even in the case where "PDF" is selected as the saving format, if the option representing the model name of the dedicated scanner is selected with respect to setting of an apparatus to be used to generate scan data or if the option representing the advanced mode is selected with respect to setting of a user interface mode, the CPU 210 may generate a compressed file by using the normal compression scheme, regardless of the designated compression level.

Alternatively, in a case where "PDF" is selected as the saving format, where the option representing the home mode is selected with respect to setting of a user interface mode, where an option representing a relatively high resolution is selected with respect to setting of a resolution, and where a relatively high compression level is designated, the CPU 210 may generate a compressed file by using the high compression scheme. Further, even in the case where "PDF" is selected as the saving format, if the option representing the advanced mode is selected with respect to setting of a user interface mode or if an option representing a relatively low resolution is selected with respect to setting of a resolution, the CPU 210 may generate a compressed file by using the normal compression scheme, regardless of the designated compression level.

(7) In the above described illustrative aspects, some of components implemented by hardware may be replaced with software, and conversely, some of components implemented by software may be replaced with hardware.

Although illustrative aspects and modifications of the invention have been described above, the embodiment of the invention described above is provided for the purpose of helping better understanding of the invention but does not limit the scope of the invention. The invention can be changed or modified without departing from the gist of the invention and the scope of claims, and includes equivalents thereof.

What is claimed is:

1. An image processing apparatus comprising:
a processor configured to:
receive selection of one option from a plurality of options including a first-kind option, which indicates a mode for a user who has a relatively-good knowledge about generation of the scan data, and a second-kind option, which indicates a mode for a user who has a relatively-poor knowledge about generation of the scan data, with respect to a user interface mode, and receive designation of a saving format for a compressed file and designation of a compression level of the compressed file;
acquire scan data generated by optical reading of a document; and
generate a compressed file by compressing the scan data,
wherein in a case where the first-kind option is selected and where a PDF format, which is different from a high-compression PDF format, is designated as the saving format for the compressed file, the processor is configured to generate the compressed file by using a first compression scheme, regardless of the designated compression level,
wherein in a case where the second-kind option is selected and where the PDF format, which is different from a high-compression PDF format, is designated as the saving format for the compressed file, the processor is configured to select one compression scheme from the first compression scheme and the second compression scheme, according to the designated compression level, and generate the compressed file by using the selected one compression scheme; and,
wherein the second compression scheme is a scheme of dividing the scan data into character image data representing a character image and background image data representing a background image and then respectively compressing the character image data and the background image data, and
wherein the first compression scheme is a scheme of compressing the scan data, without dividing the scan data into the character image data and the background image data.

2. The image processing apparatus according to claim 1,
wherein in a case where the second-kind option is selected, where the PDF format, which is different from the high-compression PDF format, is designated as the saving format for the compressed file, and where the designated compression level indicates that the data size of the compressed file is relatively large, the processor is configured to generate the compressed file by using the first compression scheme, and
wherein in a case where the second-kind option is selected, where the PDF format, which is different from the high-compression PDF format, is designated as the saving format for the compressed file, and where the designated compression level indicates that the data size of the compressed file is relatively small, the processor is configured to generate the compressed file by using the second compression scheme.

3. The image processing apparatus according to claim 1, wherein in a case where the high-compression PDF format is designated as the saving format for the compressed file, the processor is configured to generate the compressed file by using the second compression scheme, regardless of which is selected from the first-kind option and the second-kind option.

4. A non-transitory computer-readable medium having instructions to control an image processing apparatus to perform operations comprising:
receiving selection of one option from a plurality of options including a first-kind option, which indicates a mode for a user who has a relatively-good knowledge about generation of the scan data, and a second-kind option, which indicates a mode for a user who has a relatively-poor knowledge about generation of the scan data, with respect to a user interface mode, and receiving designation of a saving format for a compressed file and designation of the compression level of the compressed file;
acquiring scan data generated by optical reading of a document; and
generating a compressed file by compressing the scan data,
wherein in a case where the first-kind option is selected and where a PDF format, which is different from a high-compression PDF format, is designated as the saving format for the compressed file, the instructions controls the image processing apparatus to generate the compressed file by using a first compression scheme, regardless of the designated compression level,
wherein in a case where the second-kind option is selected and where the PDF format, which is different from a high-compression PDF format, is designated as the saving format for the compressed file, the instructions controls the image processing apparatus to select one compression scheme from the first compression scheme and the second compression scheme, according to the designated compression level, and generate the compressed file by using the selected one compression scheme, and
wherein the second compression scheme is a scheme of dividing the scan data into character image data representing a character image and background image data representing a background image and then respectively compressing the character image data and the background image data, and
wherein the first compression scheme is a scheme of compressing the scan data, without dividing the scan data into the character image data and the background image data.

5. The non-transitory computer-readable medium according to claim 4,
wherein in a case where the second-kind option is selected, where the PDF format, which is different from the high-compression PDF format, is designated as the saving format for the compressed file, and where the designated compression level indicates that the data size of the compressed file is relatively large, the instructions controls the image processing apparatus to generate the compressed file by using the first compression scheme, and
wherein in a case where the second-kind option is selected, where the PDF format, which is different from the high-compression PDF format, is designated as the saving format for the compressed file, and where the designated compression level indicates that the data size of the compressed file is relatively small, the instructions controls the image processing apparatus to generate the compressed file by using the second compression scheme.

6. The non-transitory computer-readable medium according to claim 4,
wherein in a case where the high-compression PDF format is designated as the saving format for the compressed file, the instructions controls the image processing apparatus to generate the compressed file by using the second compression scheme, regardless of which is selected from the first-kind option and the second-kind option.

7. A non-transitory computer-readable medium having instructions to control an image processing apparatus to perform operations comprising:
receiving selection of one option from a plurality of options including a first-kind option, which indicates an apparatus which has a function of generating the scan data and does not have a function of printing, and a second-kind option, which indicates an apparatus which has the function of generating the scan data and the function of printing, with respect to setting of an apparatus to be used for generation of the scan data, and receiving designation of a saving format for a compressed file and designation of the compression level of the compressed file;
acquiring scan data generated by optical reading of a document; and
generating a compressed file by compressing the scan data, wherein in a case where the first-kind option is selected and where a PDF format, which is different from a high-compression PDF format, is designated as the saving format for the compressed file, the instructions control the image processing apparatus to generate the compressed file by using a first compression scheme, regardless of the designated compression level,
wherein in a case where the second-kind option is selected and where the PDF format, which is different from the high-compression PDF format, is designated as the saving format for the compressed file, the instructions control the image processing apparatus to select one compression scheme from the first compression scheme and the second compression scheme, according to the designated compression level, and generate the compressed file by using the selected one compression scheme, and
wherein the second compression scheme is a scheme of dividing the scan data into character image data representing a character image and background image data representing a background image and then respectively compressing the character image data and the background image data, and
wherein the first compression scheme is a scheme of compressing the scan data, without dividing the scan data into the character image data and the background image data.

8. The non-transitory computer-readable medium according to claim 7,
wherein in a case where the second-kind option is selected, where the PDF format, which is different from the high-compression PDF format, is designated as the saving format for the compressed file, and where the designated compression level indicates that the data size of the compressed file is relatively large, the instructions controls the image processing apparatus to generate the compressed file by using the first compression scheme, and
wherein in a case where the second-kind option is selected, where the PDF format, which is different from the high-compression PDF format, is designated as the saving format for the compressed file, and where the designated compression level indicates that the data size of the compressed file is relatively small, the instructions controls the image processing apparatus to generate the compressed file by using the second compression scheme.

9. The non-transitory computer-readable medium according to claim 7,
wherein in a case where the high-compression PDF format is designated as the saving format for the compressed file, the instructions controls the image processing apparatus to generate the compressed file by using the second compression scheme, regardless of which is selected from the first-kind option and the second-kind option.

* * * * *